United States Patent [19]
Kitamura et al.

[11] Patent Number: 6,084,140
[45] Date of Patent: Jul. 4, 2000

[54] CATALYST FOR SELECTIVE HYDROGENATION OF HIGHLY UNSATURATED HYDROCARBON COMPOUND IN OLEFIN COMPOUND

[75] Inventors: Tadakuni Kitamura; Kouzou Takeuchi; Junichi Yazaki; Yuzo Satou; Moriyasu Sugeta, all of Toyama, Japan

[73] Assignee: Süd-Chemie Nissan Catalyst, Inc., Tokyo, Japan

[21] Appl. No.: 09/254,497

[22] PCT Filed: Sep. 11, 1997

[86] PCT No.: PCT/JP97/03196

§ 371 Date: Apr. 15, 1999

§ 102(e) Date: Apr. 15, 1999

[87] PCT Pub. No.: WO98/10863

PCT Pub. Date: Mar. 19, 1998

[30] Foreign Application Priority Data

Sep. 11, 1996 [JP] Japan .................................. 8-261216

[51] Int. Cl.⁷ ............................. C10G 45/40; B01J 23/44; C07C 5/03
[52] U.S. Cl. .......................... 585/260; 585/259; 208/143; 208/144; 502/333; 502/339
[58] Field of Search ..................... 585/259, 260; 208/143, 144; 502/333, 339

[56] References Cited

U.S. PATENT DOCUMENTS 4,686,314  8/1987  Wood et al. ............................ 585/260

FOREIGN PATENT DOCUMENTS

| 59-123539 | 7/1984 | Japan . |
| 8-229392 | 9/1996 | Japan . |
| 9-313936 | 12/1997 | Japan . |

*Primary Examiner*—Walter D. Griffin
*Assistant Examiner*—Tam M. Nguyen
*Attorney, Agent, or Firm*—McGinn & Gibb, P.C.

[57] ABSTRACT

A palladium-base catalyst can selectively hydrogenate highly unsaturated hydrocarbon compounds contained in small amounts in an olefin compound prepared by steam cracking or the like of naphtha without causing hydrogenation of the olefin as a side reaction and the precipitation of a carbonaceous material. The catalyst comprises palladium and alumina, and the exposed face of each palladium crystallite is mainly accounted for by (100) and (110) faces. Further, in the desorption of absorbed hydrogen by heating, desorption peaks are observed in the temperature ranges of 40 to 90° C. and of 120 to 170° C. and the ratio of hydrogen desorption amount of the former to the latter is (4:6) to (3:7).

7 Claims, No Drawings

CATALYST FOR SELECTIVE HYDROGENATION OF HIGHLY UNSATURATED HYDROCARBON COMPOUND IN OLEFIN COMPOUND

DESCRIPTION

1. Technical Field

Various olefin compounds used as base material sin petrochemical industries are usually produced by a steam cracking of naphtha. The olefin compounds thus produced contain highly unsaturated hydrocarbon compounds which must be removed from the olefin compounds in order to use them as materials in high molecular weight chemical industries.

The methods for removing the highly unsaturated hydrocarbon compounds include a method comprising selectively reacting these compounds with hydrogen in the presence of a catalyst, a method by means of solvent extraction and the like. The catalyst according to the present invention is applicable to the former method for obtaining high purity of olefin compounds by selective hydrogenation of the highly unsaturated hydrocarbon compounds.

2. Prior Art

It has been known that various kinds of metals have an activity for a hydrogenation reaction of highly unsaturated hydrocarbon compounds. In the case of a hydrogenation reaction carried out in petrochemical industries in order to purify olefin compounds, highly selective catalysts are required for preventing loss of olefins caused by a side reaction through hydrogenation of olefin compounds, and palladium-based catalysts have been used as such a catalyst that satisfies the requirement.

The palladium-based catalysts used in the selective hydrogenation reaction are not only highly selective but also are excellent in its activity. Thus, the reaction is initially carried out at a lower temperature and, when the activity of the catalyst is decreased to lower the reaction efficiency due to deposition of carbonaceous substances onto the surface of the catalyst caused by another side reaction, the reaction temperature is gradually raised while preventing unreacted highly unsaturated hydrocarbon compounds from remaining in the products. When the temperature is raised as high as near the critical temperature at which hydrogenation of olefin compounds are activated, the reaction is interrupted and the catalyst is then regenerated for re-use.

When reactivity of olefin compounds and acetylene compounds in the presence of a palladium catalyst are compared, acetylene compounds have significantly higher reactivity than olefin compounds have. However, since the amount of olefin compounds usually present in a reaction system is much higher than that of acetylene compounds, hydrogenation of the olefin compounds is accompanied by hydrogenation of the acetylene compounds. It is therefore preferably, in view of yield of the compounds of interest, that the catalyst to be used in the reaction is such catalyst that causes hydrogenation of the olefin compounds as a side reaction as less as possible. In addition, deposition of carbonaceous substances on the catalyst occurs due to polymerization of the highly unsaturated compounds as another side reaction, which decreases activity of the catalyst, makes long-term stable operation of the selective hydrogenation reaction difficult, and require increased frequency of a regeneration of the catalyst. Thus it is preferable that the catalyst used therein leads to deposition of the carbonaceous substance as less as possible.

In order to decrease the action of the palladium catalysts on these two kinds of the side reactions, many methods for improving selectivity of the catalysts or their use have been proposed. The methods for improving selectivity by improving the catalysts, which have been known in the art can be roughly classified into two method, one comprising addition of a co-catalyst and the other comprising improvement of a physical property of the catalysts.

As the method for improving selectivity by adding a co-catalyst to a palladium catalyst, for example, European Patent No. 722776 gazette and U.S. Pat. No. 5,489,565 gazette disclose a method for adding silver and an alkaline fluoride to a palladium-alumina catalyst; European Patent No. 689872 gazette discloses a method for preparing a catalyst by adding silver to a palladium-alumina catalyst and then subjecting the resulting mixture to a liquid phase reduction; French Patent No. 2720956 gazetta discloses a method for adding a Group IB element in Periodic Table and an alkaline or alkaline earth metal to a palladium-alumina catalyst; and French Patent No. 2603578 gazette discloses a method for adding gold to a palladium-alumina catalyst.

As the method for improving a selectivity of a catalyst by improvement of a physical property of a catalyst, for example, U.S. Pat. No. 4,726,956 gazette discloses a method for baking at a high temperature a mixture of three kinds of alumina hydrates as an alumina carrier for a palladium-alumina catalyst; Japanese Patent Publication No. 58-017835 discloses a method for using an alumina having a surface area of from 55 to 120 $m^2$/gram (g) as a carrier for a palladium-alumina catalyst; Japanese Patent Publication Nos. 63-017813 and 54-135711 gazettes disclose a palladium-alumina catalyst in which the size of the palladium crystals in the catalyst are at least 50 Å or more; European Patent No. 64301 gazette discloses a palladium-alumina catalyst which contains silver as a co-catalyst and in which the carrier consists of α-alumina having a surface area of from 3 to 7 $m^2$/g and the thickness of the palladium carrier layer is not more than 300 microns.

Among the methods for improving physical properties of catalysts, those which improve physical properties of palladium as an active ingredient merely disclose to make the diameter of palladium crystallite not less than 50 Å. There has not been proposed a method for improving selectivity of a palladium-based catalyst upon analyzing morphological and chemical properties of palladium particles carried on a carrier in a crystallographic viewpoint and considering effects of palladium crystallite faces on change of the interaction between palladium and hydrogen and on the selectivity of the catalyst.

DISCLOSURE OF THE INVENTION

Palladium-alumina catalysts, which are used for selectively hydrogenating highly unsaturated hydrocarbon compounds contained as impurities in the olefin compounds produced by a steam cracking of naphtha, have been enhanced in their selectivity by addition of a co-catalyst or by improvement of the physical properties of the catalysis, but the selectivity thereof has not yet been satisfactory. There remains a demand for improving performances of the catalysts by increasing the yield of olefin compounds by further inhibitin hydrogenation of the olefin compounds which simultaneously or successively occurs as a side reaction, by prolonging the stable operation period and by decreasing the frequency of regeneration of the catalysts by controlling generation of carbonaceous substances due to polymerization of highly unsaturated hydrocarbon compounds as another side reaction.

Needless to say, the selectivity of a catalyst is affected by fundamental physical properties such as a surface area, a pore volume, or sizes of the crystals of the constituents. In the case where a plural number of reactions occur simultaneously or successively, it is requested that the catalyst accelerates only a specific reaction. Therefore, it is considered that the catalyst surface as a reaction site should have a physical structure or crystallographic structure suitable for the reaction to be accelerated.

In other words, it is supposed that a reaction, which is required to be highly selective, is sensitive to the structure of the catalyst. Thus, an approach to develop such catalyst will be carried out by designing the structure of the catalyst from the crystallographic viewpoint, confirming the structure by experiments, using the knowledge thus obtained for designing another catalyst, and repeating these procedures. Such an approach will be very useful as a means to develop highly selective catalysts, although basic chemical knowledge with regard to inorganic syntheses must be accumulated in advance and, under the existing state of art where the basic technical knowledge necessary to enable the above-mentioned procedures is insufficient, ideas which are supposed to be effective for improving crystallographic structure of catalyst components must be repeatedly carried out by trial and error to proceed to the development of the catalysts.

In order to develop a palladium catalyst having an excellent selectivity, the present inventors noted the crystallographic structure of palladium crystallite as an effective component of a catalyst, studied the types of palladium materials and methods for treating same after they are supported on a carrier, examined the exposed surfaces of the palladium crystallites in the resulting catalysts by means of X-ray diffraction, conducted analysis with regard to adsorption of hydrogen to the catalysts by observing the statuses of the catalysts after adsorption of hydrogen and desorption thereof upon heating, and studied the relation between the physical and chemical properties of the palladium fine particles and the performance thereof with regard to selective hydrogenation of highly unsaturated hydrocarbons contained in olefin compounds.

The palladium-base catalysts which can selectively hydrogenate highly unsaturated hydrocarbons contained in olefin compounds are prepared by supporting various kinds of palladium compound materials on a carrier, and subjecting the supported palladium compounds to drying, baking and reduction. The activity and selectivity of a catalyst are affected by the kind of palladium compound materials, the kind of carriers, the method for supporting a palladium compound on a carrier, methods for drying, baking and reducing the supported palladium compound, etc.

As the palladium materials, any palladium compound can be used as long as it is soluble in water and does not contain such components which finally remain in the resulting catalyst to give poisonous catalyst residues. Usually used are those materials which are readily available, such as palladium chloride, palladium sodium chloride, palladium nitrate, palladium sulfate, tetrachloropalladates, dichlorodiammine palladium, ammine complexes of palladium and dinitropolyammine palladiums.

The materials used as a carrier are porous inorganic oxides including silica, alumina and titanium oxide. Particularly, alumina is generally used and there have been disclosed, as one of the methods for improving the catalyst, the physical properties of the alumina which are preferable for improving selectivity of a catalyst. However, an optimum carrier is optionally selected depending on the kind of a reaction of interest, a method for preparation of the catalyst to be applied thereto and the like.

The methods for supporting a palladium material on a carrier include a soaking method which comprises adding the carrier to an aqueous solution of the palladium compound and utilizes the action of adsorption of the carrier, an immersion or impregnation method which comprises filling the pore volume of the carrier with an aqueous solution of the palladium compound to physically carry the palladium compound, and a spray method which comprises spraying the palladium compound to the carrier.

After the palladium compound is supported on the carrier, the resulting palladium-carrier is dried and baked. These treatments are usually carried out in air. Particularly, baking must be carried out carefully selecting a baking temperature depending on the size of the palladium particles because baking affects on the activity and selectivity of the resulting catalyst.

Then the catalyst is subjected to reduction. The reduction treatment is usually conducted by using hydrogen in a gas phase under heating. It is also possible to conduct the reduction in a liquid phase by using water-soluble organic compounds, hydrazine, sodium boron hydride or the like as another reduction method. In this case, the palladium material supported on the carrier may be directly reduced, or alternatively it can be reduced in a liquid phase after drying and baking treatments.

In the catalyst thus obtained, the palladium fine particles supported on the carrier usually have a spherical shape and are characterized by that (111) face of the crystal has mainly grown. When hydrogen is adsorbed on the catalyst and then desorbed therefrom by heating, desorption peaks are observed in the temperature ranges of from 40 to 90° C. and from 120 to 170° C., and the amount of the desorbed hydrogen in the former temperature range is 1.5 to 2.5 times larger than in the latter temperature range, which shows that a large amount of hydrogen is chemically adsorbed weakly on palladium.

As one of the researches, the present inventors noted treatment after supporting a palladium compound material on a carrier, conducted heat treatment at a relatively higher temperature in an inert gas stream or a reducing gas stream instead of usual baking treatment in air, examined the exposed surface of the palladium crystallites in the resulting catalyst by means of X-ray diffraction, analyzed adsorption of hydrogen to the catalyst by observing the statuses of the catalyst after adsorption of hydrogen and desorption thereof upon heating, and studied the relation between the physical and chemical properties of the palladium fine particles and performance thereof with regard to the selective hydrogenation of highly unsaturated hydrocarbons contained in olefin compounds.

As the result, it was confirmed, upon research on the exposed crystal faces of the palladium fine particles in the catalyst which had been obtained by the heat treatment at a relatively higher temperature in an inert gas stream or a reducing gas stream instead of usual baking in air, that the palladium crystals exhibited exposed faces mainly developed of (100) and (110) faces, which was not observed in ordinary catalysts. When hydrogen was adsorbed on the catalyst and then desorbed therefrom by heating, desorption peaks were observed in the temperature ranges of from 40 to 90° C. and from 120 to 170° C. as observed in ordinary catalysts, but the amount of the desorbed hydrogen in the latter temperature range was 1.5 to 2.5 times larger that in the former temperature range. Thus, it was confirmed that a higher proportion of hydrogen was strongly adsorbed on the catalyst, which was not observed in ordinary catalysts.

Using the catalyst thus obtained, selective hydrogenation reaction of highly unsaturated hydrocarbons in olefin compounds was carried out in a fixed bed pressurized flow reaction apparatus, and the performance of the catalyst was compared with another catalyst which had been prepared according to a usual preparation method by supporting palladium chloride on an alumina carrier and then subjecting the resulting palladium-carrier to drying and baking in air and reducing by hydrogen. The catalyst according to the present invention exhibited a remarkably low loss of the olefin compounds due to hydrogenation thereof as a side reaction compared with the ordinary catalysts, as well as contained a considerably low amount of carbonaceous substances deposited on the catalyst due to polymerization of the highly unsaturated hydrocarbon compounds.

With regard to the atmosphere of the heat treatment effected after supporting the palladium compound material on the carrier, there is no restriction as to the kind of the gas as far as the treatment is carried out in an inert gas stream. Practically, it is preferred to use nitrogen, carbon dioxide gas or steam atmosphere. In the case where the heat treatment is carried out in a reducing gas stream, hydrogen gas or a mixture of hydrogen diluted with an inert gas is used.

The heat treatment temperature is in a range of from 500 to 1200° C., preferably of from 600 to 1000° C. If the temperature is 500° C. or lower, crystal faces (100) and (110) will not grow in the palladium particles, while if the temperature is 1200° C. or higher, the physical properties of the catalyst will be deteriorated to fall to give a satisfactory catalyst.

When the heat treatment is carried out in an inert gas stream atmosphere, it is necessary to reduce the catalyst; the reduction is preferably conducted in a hydrogen stream as in the case of ordinary catalysts at a temperature in the range of from 100 to 500° C. for from 1 to 2 hours. When the heat treatment is carried out in the atmosphere with a reducing gas stream, reduction treatment of the catalyst is not necessary.

The catalyst thus obtained contained palladium crystals which exhibited exposed faces mainly formed of (100) and (110) faces. When hydrogen was adsorbed on the catalyst and then desorbed thereform by heating, desorption peaks were observed in the temperature ranges of from 40 to 90° C. and from 120 to 170° C. as observed in ordinary catalysts, but the amount of the desorbed hydrogen in the latter temperature range was 1.5 to 2.5 times larger than that in the former temperature range, which was not observed in ordinary catalysts. The catalyst contained palladium having a surface area of from 1 to 100 $m^2$ per a gram of palladium.

Any palladium materials can be employed in the present invention as long as they are decomposed by the heat treatment and finally remain on a carrier but do not contain components which are poisonous to catalysts. Such palladium materials include palladium chlorides, palladium nitrate and ammonium tetrachloropalladate. The amount of palladium supported on a carrier is in the range of from 0.02 to 3.0% by weight.

As the carrier, alumina is preferably used and alumina of any shape may be used. However, since the catalyst according to the present invention is used in the form of a molded article, when powdery alumina is used as a starting material, there is necessity to mold it during preparation of the catalyst. If the powdery alumina is molded after having palladium carried thereon, the palladium will be uniformly distributed in the resulting molded article, and thus it will be difficult to effectively use the palladium present inside the molded article. Therefore, it is desirable to use molded articles of alumina such as tablets, columns, extruded articles having gear shapes in radial cross-section or spherical shapes, and these molded articles having a surface area in the range of from 1 to 350 $m^2/g$ may be used.

A catalyst, in which the crystal faces of palladium particles have grown differently from those in conventional catalysts and in which a proportion of the palladium particles having a property to strongly adsorb hydrogen is high, may be obtained by heat treating the palladium compound material supported on the carrier in an inert gas stream and then reducing it, or by heating treating and simultaneously reducing the palladium compound on the carrier in a reducing gas stream.

Such catalyst can be obtained also by supporting a specific palladium compound on a carrier and then reducing the palladium compound-supporting carrier in a liquid phase.

Also in these cases, it is preferably to use as the carrier a molded alumina pressed into tablet, an extruded article of alumina having a shape of column or a gear shape in radial cross-section or having a spherical shape and having a surface area in the range of from 1 to 350 $m^2/g$. The materials which can be used as the specific palladium compound include dinitropolyammine palladiums and dichlorodiammine palladiums. Such palladium compounds are supported on a carrier in an amount of 0.02 to 3.0% by weight of palladium by a soaking method, a spraying method, or an immersion or an impregnation method. And after completion of the supporting operation, the palladium compounds on the carrier are dried or directly reduced in a liquid phase without drying, followed by washing with water and drying to give an aimed catalyst.

Using the catalyst thus obtained, selective hydrogenation reaction of acetylene compounds and diene compounds contained in various olefin compounds was carried out in a fixed bed pressurized flow reaction apparatus. It was confirmed that the catalyst selectively hydrogenated only highly unsaturated hydrocarbons without hydrogenating olefin compounds as a side reaction, and that it scarcely caused deposition of carbonaceous substances on the catalyst due to polymerization of the highly unsaturated hydrocarbons as another side reaction to complete the present invention.

The scope of the reactions in which a catalyst according to the invention exhibits selectivity is not restricted with regard to the number of carbon atoms of the reactants, and the catalyst is applicable to selective hydrogenations of acetylene in ethylene, propadiene and methylacetylene in propylene, butadienes and ethylacetylene in butenes, dienes in decomposed gasoline and the like. Reaction conditions in selective hydrogenations of highly unsaturated hydrocarbons contained in various kinds of olefins conducted in petrochemical industries vary depending on the number of carbon atoms of the reactants. Specifically, in the case of selective hydrogenation of acetylene in ethylene, for example, by a front end method where acetylene, propadiene and methylacetylene in a mixture of olefins, ethylene and propylene, are selectively hydrogenated, hydrogenation reaction is initially carried out at a temperature of from 50 to 70° C., and then the reaction temperature is gradually raised as the activity of the catalyst decreases. When the temperature reaches 90 to 150° C., the reaction is stopped and the catalyst is then regenerated to perform the reaction again. The maximum temperature raise by the reaction heat should be not more than 40 to 45° C., preferably not more than 20 to 30° C., relative to an inlet temperature, and the other reaction conditions are as follows: a pressure in the range of from 5 to 35 $kg/cm^2$.G; SV in the range of from 4000 to 8000 (liter/hr). In a tail end method which selectively hydrogenates acetylene contained in the ethylene separated from a mixture of ethylene and propylene, the reaction conditions are as follows: reaction temperature in the range of from 25 to 120° C.; pressure of up to 30 kg/cm$^2$.G; SV in the range of from 2000 to 3500 (liter/hr); and hydrogen/acetylene molar ratio in the range of from 1.1 to 3.0. Each time the activity decreases, regeneration of the catalyst is repeated as in the front end method, and hydrogenation is carried out at a temperature in the range of from 25 to 120° C.

In the selective hydrogenation of propadiene and methylacetylene in propylene in a gas phase as in the case of hydrogenation of acetylene in ethylene, the following reaction conditions are adopted; reaction temperature in the range of from 50 to 120° C.; pressure in the range of from 4 to 25 kg/cm$^2$.G; SV in the range of from 1000 to 3000 (liter/hr); and hydrogen/(propadiene+methylacetylene) molar ratio of less than 3.0. Also in this case, the catalyst is regenerated each time when the activity decreases, and the reaction is conducted in the temperature range of from 55 to 175° C. On the other hand, when the selective hydrogenation reaction of propadiene and methylacetylene in propylene is carried out in a liquid phase, the following conditions are usually employed; reaction temperature in the range of from 20 to 40° C.; pressure in the range of from 20 to 70 kg/cm$^2$.G; LHSV of up to 10 (liter/hr); and hydrogen/(propadiene+methylacetylene) molar ratio of less than 3.0. Each time the activity decreases, the catalyst is regenerated as in the case of the gas phase reaction and the reaction is conducted at a temperature of from 20 to 40° C.

A selective hydrogenation reaction of butadiene and ethylacetylene in butene and a selective hydrogenation reaction of dienes in decomposed gasoline are carried out in a liquid phase under the conditions of a reaction temperature in the range of from 40 to 150° C., a pressure in the range of from 14 to 70 kg/cm$^2$.G; LHSV of up to 10 (liter/hr); and hydrogen/liquid material volume ratio of 50 to 350. Each time the activity decreases, the catalyst is regenerated as in the case of the gas phase reaction and the reaction is conducted at a temperature in the range of 40 to 150° C. with repeating the regeneration.

When the catalyst, according to the present invention, is used for these hydrogenation reactions usually carried out in petrochemical industries, it is possible to remarkably decrease loss of olefins of interest due to hydrogenation of olefin compounds as a side reaction and also to decrease deposition of carbonaceous substances on the catalyst caused by polymerization of highly unsaturated hydrocarbon compounds as another side reaction. Thus, it is possible to carry out a long term stable operation which needs less frequency of regeneration of catalyst as compared in conventional catalysts by using the catalyst according to the present invention.

Effects of the Invention

Among palladium-alumina catalysts which may be used for selectively hydrogenating highly unsaturated hydrocarbon compounds contained in a small amount in olefin compounds, the catalyst according to the present invention, where the exposed faces of the crystals of palladium fine particles are mainly composed by (100) and (110) faces, desorption peaks of hydrogen desorbed from the absorbed hydrogen upon heating are observed in the temperature ranges of from 40 to 90° C. and from 120 to 170° C. and the ratio of the amount of the desorbed hydrogen in the former temperature range to that in the latter temperature range is 4:6 to 3:7; exhibits excellent performances in selective hydrogenation of highly unsaturated hydrocarbon compounds, improves in the yield of olefins and enables a long term operation without regeneration of the catalyst, and provides a very high economical effects for practical use.

Next, the present invention is specifically explained by way of examples. In the following described are a method for measuring crystal faces of palladium fine particles by means of a X-ray diffraction, a method for testing adsorption and desorption of hydrogen on palladium, a method for measuring a surface area of palladium, a methods for testing selective hydrogenation of acetylene contained in ethylene by a front end method and by a tail end method, a method for testing selective hydrogenation of propadiene and methylacetylene contained in propylene, a method for testing selective hydrogenation of butadiene and ethylacetylene contained in butene, and a method for testing selective hydrogenation of dienes contained in decomposed gasoline, all of which methods are described in Examples.

Namely, crystal faces of palladium crystallites are determined by conducting X-ray diffraction measurement on the catalyst and calculating the crystal lattice sizes of the crystallites in (100), (110) and (111) faces from the half-width values of the (200), (220) and (111) diffraction peaks of palladium. Measurement of the amount of desorbed hydrogen after adsorption of hydrogen is carried out by treating the catalyst with hydrogen at 110° C. for 60 minutes, and, after cooling to 30° C., storing the catalyst in a hydrogen stream for 60 minutes to allow hydrogen adsorbed on the catalyst, desorbing the adsorbed hydrogen from the catalyst by heating to 300° C. at a rate of 3° C./min, and then measuring the amount of the desorbed hydrogen. The surface area of palladium is determined by reducing the catalyst with hydrogen, and, after degasing at 300° C., allowing the catalyst to adsorb carbon monoxide at 110° C., measuring the amount of the adsorbed carbon monoxide, and calculating the surface area according to the following equation:

surface area=444.9×106.42×(amount of adsorbed carbon monoxide (ml) per 1 g of palladium)/22400

On the other hand, selective hydrogenation of highly unsaturated hydrocarbon compounds contained in various olefin compounds is carried out by using a fixed bed pressurized flow reaction apparatus, and the reactants are allowed to flow downwards. Selective hydrogenation of acetylene in ethylene is effected in a gas phase, while all of the other reactions are carried out in a liquid phase. The methods for calculating test conditions, activity and selectivity and a performance about each type of the reactants are as follows:

Test of Selective hydrogenation for acetylene in ethylene
Conditions for reduction of a catalyst and for the test A catalyst is tested after a preliminary reduction treatment. Reduction conditions and test conditions are as follows:

|  |  | Condition I (tail end method) | Condition II (front end method) |
|---|---|---|---|
| Reduction conditions | catalyst amount | 25 ml | 25 ml |
|  | GHSV | 1000/hr. | 2400/hr. |
|  | reaction temperature | 90° C. | 90° C. |
|  | pressure | 15 kg/cm$^2$ G | 1 atm |
|  | reaction time | 16 hrs. | 1.0 hr. |
|  | gas composition | hydrogen 10% + nitrogen 90% | hydrogen 100% |
| Test Conditions | catalyst amount | 25 ml | 25 ml |
|  | GHSV | 5000/hr. | 2400/hr. |
|  | reaction temperature | 65° C. | 23~° C. |
|  | pressure | 15 kg/cm$^2$ G | 15 kg/cm$^2$ G |
|  | reaction time | 8 hrs. | 8 hrs. |
|  | gas composition |  |  |
|  | acetylene | 1.0% | 1450 ppm |
|  | ethylene | 97.5% | 43.4% |

-continued

|  | Condition I (tail end method) | Condition II (front end method) |
|---|---|---|
| hydrogen | 1.5% | 22.9% |
| ethane | 0% | 33.5% |
| carbon monoxide | 0 ppm | 250 ppm |

Methods for calculating of an activity and a selectivity

Methods for calculating an activity and a selectivity are difference between tail end method and front end method as follows:

Tail end method activity=($\Delta$acetylene/inlet acetylene concentration)×100(%)
selectivity=($\Delta$ethylene/$\Delta$acetylene)×100(%)

$\Delta$acetylene=(inlet acetylene concentration—outlet acetylene concentration)

$\Delta$ethylene=(outlet ethylene concentration—inlet ethylene concentration)

Stability of performance

After the test, the weight of the polymers produce din the catalyst is measured and the amount of carbon per 1 g of converted acetylene is calculated.

unit: carbon(g)/converted acetylene $C_2H_2(g)$

Front end method activity: the temperature at which outlet acetylene concentration reaches 1 ppm or less (clean-up temperature) is measured.

Selectivity: (light-off temperature—clean-up temperature)

The light-off temperature means a temperature at which rapid hydrogenation of ethylene starts and can be measured as the temperature at which the top of the catalyst layer raises suddenly.

Incidentally, gas analysis was carried out by means of FID utilizing gas chromatography.

Test for selective hydrogenation on propadiene and methylacetylene in propylene Conditions for reduction of a catalyst and for the test The reduction conditions and test conditions are as follows:

| Reduction Conditions | catalyst amount | 5 ml |
| | GHSV | 1000/hr |
| | reaction temperature | 110° C. |
| | pressure | 20 kg/cm² G |
| | reaction time | 17 hrs. |
| | gas composition | hydrogen 100% |
| Test conditions (Condition III) | catalyst amount | 5 ml |
| | LHSV | 20/hr. |
| | reaction temperature | 20° C. |
| | pressure | 25 kg/cm² G |
| | reaction time | 24 hrs. |
| | amount of hydrogen | 1.4 mol/ (methylacetylene/propadiene) |
| | raw material composition (mol %) | |
| | methylacetylene | 0.3088 |
| | propadiene | 0.0784 |
| | propylene | 94.3462 |
| | propane | 5.2304 |

Method for calculating for catalytic performance

From the analytical results of the raw materials and the products, the propylene concentration at the tie when the outlet concentration of methylacetylene reached 5 ppm was calculated according to a reaction rate equation, and a propylene gain was calculated as a catalyst performance according to the following equation: propylene gain (mol %)=outlet propylene concentration (mol %)—inlet propylene concentration (mol %)

Test for selective hydrogenation of 1,3-butadiene in C4 fraction Conditions for reduction of a catalyst and for the test The reduction conditions and the test conditions are as follows:

| Reduction conditions | catalyst amount | 5 ml |
| | GHSV | 1000/hr. |
| | reaction temperature | 110° C. |
| | pressure | 20 kg/cm² G |
| | reaction time | 17 hrs. |
| | gas composition | hydrogen 100% |
| Test conditions (Conditions IV) | catalyst amount | 5 ml |
| | LHSV | 37/hr. |
| | reaction temperature | 40° C. |
| | pressure | 20 kg/cm² G |
| | reaction time | 30 hrs. |
| | amount of hydrogen | 2 mol/(diene mol) |
| | raw material composition (mol %) | |
| | isobutane | 1.386 |
| | n-butane | 9.732 |
| | 1-butene | 18.755 |
| | 2-butene | 20.201 |
| | isobutene | 49.403 |
| | 1,3-butadiene | 0.478 |

Method for calculating catalyst performance

From the analytical results of the raw materials and the products, the 1-butene concentration at the time when the outlet concentration of 1,3-butadiene reached 10 ppm was calculated according to a reaction rate equation, and the yield of 1-butene as a catalyst performance was calculated according to the following equation:

1-butene yield (mol %)=(1-butene content (mol %) in the produced gases)/(1-butene content (mol %) in the reactant gases)× 100

Test for Selective hydrogenation on decomposed gasoline Conditions for reduction of a catalyst and for the test The reduction conditions and the test conditions are as follows:

| Reduction conditions | catalyst amount | 25 ml |
| | gas flow | 25 NL/hr. |
| | reaction temperature | 110° C. |
| | pressure | 30 kg/cm² G |
| | reaction time | 3 hrs. |
| | gas composition | hydrogen 100% |
| Test conditions (Condition V) | catalyst amount | 25 ml |
| | LHSV | 3.5/hr. |
| | reaction temperature | 35° C. |
| | pressure | 30 kg/cm² G |
| | reaction time | 24 hrs. |
| | amount of hydrogen | 25 NL/hr. |
| | raw material composition | |
| | styrene | 3.5% |
| | benzene | 47.2% |
| | toluene | 18.6% |
| | other components | 30.7 |
| | diene value | 17.6 |
| | bromine value | 38.4 |

Method for calculating an activity and a selectivity

The following three kinds of conversion rate were calculated as a catalyst activity.

Conversion rate of dienes: Diene values of the raw material before and after reaction were quantified by reacting the raw material with maleic anhydride and then titrating unreacted maleic anhydride.

Conversion rate of bromine value: Bromine values of the raw material before and after reaction were quantified by treating the raw material with an excess amount of potassium bromide-potassium bromate standard solution, reducing excess bromine with potassium iodide, and then titrating free iodide with sodium thiosulfate.

Conversion rate of styrene: Quantitative analysis was carried out by gas chromatography utilizing FID.

EXAMPLE 1

Palladium chloride (0.126 g) was taken in a 100 ml beaker, and 1.0 cc of aqueous 3N hydrochloric acid solution and 78 cc of pure water were added thereto. The resulting mixture was heated while stirring to prepare 82 cc of an aqueous solution of palladium chloride. On the other hand, 150 g of an alumina carrier having a spherical shape of 3 mm in diameter and surface area of 25 $m^2/g$ was taken in a 500 cc beaker and placed in a rotating vessel. The aqueous solution of palladium chloride place din a spraying vessel was sprayed onto the carrier for 5 minutes with rotating the carrier. After completion of spraying, rotation of the carrier was stopped, and the carrier was allowed to stand for 10 minutes, dried at 110° C. for 20 hours in air to give a palladium chloride-carrying alumina as an intermediate.

The intermediate thus obtained was placed in an electric oven replaced with nitrogen gas, heated up to 1000° C. in 5 hours in nitrogen gas flowing at a rate of 100 cc per a minute and then baked at 100° C. for 4 hours to give a catalyst of Example 1. The resulting catalyst was determined with regard to components and physical properties, and the performance thereof was tested under the Conditions I and II. The results of the determinations of a palladium content, a surface area of palladium and crystal faces of palladium were shown in Table 1, that of the amount of hydrogen desorbed from the catalyst was shown in Table 2, and that of the performance test with regard to selective hydrogenation of acetylene in ethylene was shown in Table 3.

EXAMPLE 2

The palladium chloride-carrying alumina as the intermediate in Example 1 was placed in a closed reaction tube and, after replacing the tube with a gaseous mixture of 10% hydrogen and 90% nitrogen, heated up to 1000° C. in 5 hours in the gaseous mixture flowing at a rate of 100 cc per a minute and then baked at 1000° C. for 4 hours to give a catalyst of Example 2. The resulting catalyst was determined with regard to components and physical properties and the performance thereof was tested under the Conditions I and II. The results of the determinations of a palladium content, a surface area of palladium and crystal faces of palladium were shown in Table 1, that of the amount of hydrogen desorbed from the catalyst was shown in Table 2, and that of the performance test with regard to selective hydrogenation of acetylene in ethylene was shown in Table 3.

EXAMPLE 3

The palladium chloride-carrying alumina as the intermediate in Example 1 was placed in a closed reaction tube and, after replacing the tube with hydrogen, heated up to 1000° C. in 5 hours in hydrogen gas flowing at a rate of 100 cc per a minute and then baked at 1000° C. for 4 hours to give a catalyst of Example 3. The resulting catalyst was determined with regard to components, and physical properties and the performance thereof was tested under the Conditions I and II. The results of the determinations of a palladium content, a surface area of palladium and crystal faces of palladium were shown in Table 1, that of the amount of hydrogen desorbed from the catalyst was shown in Table 2, and that of the performance test with regard to selective hydrogenation of acetylene in ethylene was shown in Table 3.

Comparative Example 1

The palladium chloride-carrying alumina as the intermediate in Example 1 was placed in an electric oven, heated up to 1000° C. in 5 hours in air and then baked at 1000° C. for 4 hours to give a catalyst of Comparative Example 1. The resulting catalyst was determined with regard to components and physical properties, and the performance thereof was tested under the Conditions I and II. The results of the determinations of a palladium content, a surface area of palladium and crystal faces of palladium were shown in Table 1, that of the amount of hydrogen desorbed from the catalyst was shown in Table 2, and that of the performance test with regard to selective hydrogenation of acetylene in ethylene was shown in Table 3.

EXAMPLE 4

Palladium chloride (0.756 g) was taken in a 100 ml beaker, and 4.0 cc of aqueous 3N hydrochloric acid solution and 78 cc of pure water were added thereto. The resulting mixture was heated under stirring to prepare 82 cc of an aqueous solution of palladium chloride. One handled and fifty grams of an alumina carrier having a spherical shape of 3 mm in diameter and a surface area of 25 $m^2/g$ was taken in a 500 cc beaker and placed in a rotating vessel. The aqueous solution of palladium chloride taken in a spraying vessel was sprayed onto the carrier for 5 minutes while rotating the carrier. After completion of spraying, rotation of the carrier was stopped, and the carrier was allowed to stand for 10 minutes, dried at 110° C. for 20 hours in air to give a palladium chloride-carrying alumina as an intermediate.

The intermediate was placed in an electric oven replaced with nitrogen gas, heated up to 1000° C. in 5 hours in a nitrogen gas flowing at a rate of 100 cc per a minute and then baked at 1000° C. for 4 hours to give a catalyst of Example 4. The resulting catalyst was determined with regard to components and physical properties, and the performance thereof was tested under the Condition III. The results of the determinations of a palladium content, a surface area of palladium and crystal faces of palladium were shown in Table 1, that of the amount of hydrogen desorbed from the catalyst was shown in Table 2, and that of the performance test with regard to selective hydrogenation of propadiene and methylacetylene in propylene was shown in Table 4.

EXAMPLE 5

The palladium chloride-carrying alumina as the intermediate in Example 4 was placed in a closed reaction tube and, after replacing the tube with a mixture of 10% of hydrogen and 90% of nitrogen, heated up to 1000° C. in 5 hours in the gas mixture flowing at a rate of 100 cc per a minute and then baked at 1000° C. for 4 hours to give a catalyst of Example 5. The resulting catalyst was determined with regard to components and physical properties, and the performance there of was tested under the Condition III. The results of the determinations of a palladium content, a surface area of palladium and crystal faces of palladium were shown in Table 1, that of an amount of hydrogen desorbed from the catalyst was shown in Table 2, and that of the performance test with regard to selective hydrogenation of propadiene and methylacetylene in propylene was shown in Table 4.

EXAMPLE 6

The palladium chloride-carrying alumina as the intermediate in Example 4 was placed in a closed reaction tube and, after replacing the tube with hydrogen, heated up to 1000° C. in 5 hours in hydrogen gas flowing at a rate of 100 cc per a minute and then baked at 1000° C. for 4 hours to give a catalyst of Example 6. The resulting catalyst was determined with regard to components and physical properties, and the performance thereof was tested under the Condition III. The results of the determinations of a palladium content, a surface area of palladium and crystal faces of palladium were shown in Table 1, that of the amount of hydrogen desorbed form the catalyst was shown in Table 2, and that of the performance test with regard to selective hydrogenation of propadiene and methylacetylene in propylene was shown in Table 4.

Comparative Example 2

The palladium chloride-carrying alumina as the intermediate in Example 4 was placed in an electric oven, heated up to 1000° C. in 5 hours in air and then baked at 1000° C. for 4 hours to give a catalyst of Comparative Example 2. The resulting catalyst was determined with regard to components and physical properties, and the performance thereof was tested under the Condition III. The results of the determinations of a palladium content, a surface area of palladium and crystal faces of palladium were shown in Table 1, that of the amount of hydrogen desorbed from the catalyst was shown in Table 2, and that of the performance test with regard to selective hydrogenation of propadiene and methylacetylene in propylene was shown in Table 4.

EXAMPLE 7

One handled and fifty cc of an ammonium tetrachloropalladate solution having a palladium content of 3 g/l was weighed and taken in a 300 cc beaker. In this solution 150 g of alumina carrier having a surface area of 150 m²/g and a diameter of 3 mm was soaked for 1 hour, and the palladium compound was supported on the carrier to give an ammonium tetrachloropalladate-carrying alumina as an intermediate.

The intermediate thus obtained was placed in an electric oven replaced with nitrogen gas, heated up to 1000° C. in 5 hours in nitrogen gas flowing at a rate of 100 cc per a minute and baked at 1000° C. for 4 hours to give a catalyst of Example 7. The resulting catalyst was determined with regard to components and physical properties, and the performance thereof was tested under the Condition IV. The results of the determinations of a palladium content, a surface area of palladium and crystal faces of palladium were shown in Table 1, that of the amount of hydrogen desorbed from the catalyst was shown in Table 2, and that of the performance test with regard to selective hydrogenation of 1,3-butadiene in butene was shown in Table 5.

Comparative Example 3

The ammonium tetrachloropalladate-carrying alumina obtained in Example 7 was dried at 110° C. for 20 hours, placed in an electric oven, heated up to 1000° C. in 5 hours in air, and then baked at 1000° C. for 4 hours to give a catalyst of Comparative Example 3. The resulting catalyst was determined with regard to components and physical properties, and the performance thereof was tested under the Condition IV. The results of the determinations of a palladium content, a surface area of palladium and crystal faces of palladium were shown in Table 1, that of the amount of hydrogen desorbed from the catalyst was shown in Table 2, and that of the performance test with regard to selective hydrogenation of 1,3-butadiene in butene was shown in Table 5.

EXAMPLE 8

One handled and fifty cc of a palladium nitrate solution having a palladium content of 3 g/l was weighed and taken in a 300 cc beaker. In this solution alumina carrier having a surface area of 300 m²/g and a diameter of 3 mm was soaked for 1 hour to support the palladium compound on the carrier. The resulting palladium compound-carrying alumina was dried at 110° C. for 20 hours, and then placed in a closed reaction tube. The reaction tube was replaced with $H_2$ gas, heated up to 900° C. in 5 hours in hydrogen gas flowing at a rate of 100 cc per a minute and baked at 900° C. for 4 hours to give a catalyst of Example 8. The resulting catalyst was determined with regard to components and physical properties, and the performance thereof was tested under the Condition IV. The results of the determinations of a palladium content, a surface area of palladium and crystal faces of palladium were shown in Table 1, that of the amount of hydrogen desorbed from the catalyst was shown in Table 2, that of the performance test with regard to selective hydrogenation of 1,3-butadiene in butene was shown in Table 5, and that of hydrogenation of decomposed gasoline was shown in Table 6.

Comparative Example 4

The baking procedure in Example 8 was carried out in air instead of flowing hydrogen to give a catalyst of Comparative Example 4. The resulting catalyst was determined with regard to components and physical properties, and the performance thereof was tested under the Condition IV. The results of the determinations of a palladium content, a surface area of palladium and crystal faces of palladium were shown in Table 1, that of the amount of hydrogen desorbed from the catalyst was shown in Table 2, that of the performance test with regard to selective hydrogenation of 1,3-butadiene in butene was shown in Table 5, and that of hydrogenation of decomposed gasoline was shown in Table 6.

EXAMPLE 9

One handled and fifty spherical alumina carrier having a surface area of 50 m²/g and a diameter of 3 mm was taken in a 500 cc beaker and placed in a rotating vessel. Eighty two cc of an aqueous solution of sodium tetracyanopalladate having a palladium concentration of 18.1 g/l prepared separately was taken in a spraying vessel and sprayed onto the carrier for 5 minutes while rotating the carrier. After completion of spraying, rotation of the carrier was stopped, and the carrier was allowed to stand for 10 minutes, dried at 110° C. for 20 hours in air. The resulting carrier was placed in an electric oven replaced with nitrogen gas, heated up to 800° C. in 4 hours in a nitrogen gas flowing at a rate of 100 cc per a minute, and then baked at 800° C. for 4 hours to give a palladium-carrying alumina as an intermediate.

One handled and sixty three cc of a 5% reducing solution was prepared by dissolving sodium boron hydride in pure water. The palladium compound mentioned above was soaked in the reducing solution for 1 hour at room temperature to effect palladium reduction, washed with water, and dried at 100° C. for 20 hours to prepare a catalyst of Example 9. The resulting catalyst was determined with regard to components and physical properties, and the performance thereof was tested under the Condition V. The results of the determinations of a palladium content, a surface area of palladium and crystal faces of palladium were shown in Table 1, that of the amount of hydrogen desorbed from the catalyst was shown in Table 2, and that of the performance test with regard to hydrogenation of decomposed gasoline was shown in Table 6.

EXAMPLE 10

A reducing liquid was prepared by dissolving 0.14 g of sodium hydroxide and 7 cc of formalin solution in 162 cc of pure water. The palladium-carrying alumina intermediate baked at 800° C. for 4 hours prepared in Example 9 was soaked in the reducing liquid warmed to 60° C. for 1 hour to effect palladium reduction. The resulting palladium-carrying alumina was then washed with water and dried at 110° C. for 20 hours to obtain a catalyst of Example 10. The resulting catalyst was determined with regard to components and physical properties, and the performance thereof was tested under the Condition V. The results of the determinations of a palladium content, a surface area of palladium and crystal faces of palladium were shown in Table 1, that of the amount of hydrogen desorbed from the catalyst was shown in Table 2, and that of the performance test with regard to hydrogenation of decomposed gasoline was shown in Table 6.

Comparative Example 5

The palladium-carrying alumina before baking at 800° C. for 4 hours prepared in Example 9 was placed in an electric oven, heated up to 900° C. in 4 hours in air and then baked at 900° C. for 4 hours for preparing a catalyst of Comparative Example 5. Example 10 was repeated excepting the above-mentioned procedures to obtain a catalyst of Comparative Example 5. The resulting catalyst was determined with regard to components and physical properties, and the performance thereof was tested under the Condition V. The results of the determinations of a palladium content, a surface area of palladium and crystal faces of palladium were shown in Table 1, that of the amount of hydrogen desorbed from the catalyst was shown in Table 2, and that of the performance test with regard to hydrogenation of decomposed gasoline was shown in Table 6.

EXAMPLE 11

One handled and fifty cc of a nitric acid solution of dinitrodiamminepalladium having a palladium content of 0.3 g/l was measured and taken in a 300 cc beaker. In this solution alumina carrier having a surface area of 90 m$^2$/g and a diameter of 3 mm was soaked for 1 hour, and the palladium compound was supported on the carrier to give a dinitrodiammine-palladium-carrying alumina as an intermediate.

The intermediate thus obtained was soaked for 1 hour in a 5% aqueous solution of sodium formate, which was prepared separately and warmed to 60° C., to effect palladium reduction. The treated intermediate was washed with water and then dried at 110° C. for 20 hours to give a catalyst of Example 11. The resulting catalyst was determined with regard to components and physical properties, and the performance thereof was tested under the Conditions I and II. The results of the determinations of a palladium content, a surface area of palladium and crystal faces of palladium were shown in Table 1, that of the amount of hydrogen desorbed from the catalyst was shown in Table 2, and that of the performance test with regard to selective hydrogenation of acetylene in ethylene was shown in Table 3.

EXAMPLE 12

One handled and fifty cc of a nitric acid solution of dinitrodiamminepalladium having a palladium content of 0.5 g/l was measured and taken in a 300 cc beaker. In this solution an alumina carrier having a surface area of 150 m$^2$/g and a diameter of 3 mm was soaked for 1 hour, and the palladium compound was supported on the carrier to give a dinitrodiammine-palladium-carrying alumina as an intermediate.

The intermediate thus obtained was soaked for 1 hour in a 5% aqueous solution of sodium formate prepared separately and warmed to 60° C. to effect palladium reduction. The treated intermediate was washed with water and then dried at 110° C. for 20 hours to give a catalyst of Example 12. The resulting catalyst was determined with regard to components and physical properties, and the performance thereof was tested under the Conditions I and II. The results of the determinations of a palladium content, a surface area of palladium and crystal faces of palladium were shown in Table 1, that of the amount of hydrogen desorbed from the catalyst was shown in Table 2, and that of the performance test with regard to selective hydrogenation of acetylene in ethylene was shown in Table 3.

EXAMPLE 13

One handled and fifty cc of a nitric acid solution of dinitrodiamminepalladium having a palladium content of 3 g/l was measured and taken in a 300 cc beaker. In this solution an alumina carrier having a surface area of 200 m$^2$/g and a diameter of 3 mm was soaked for 1 hour, and the palladium compound was supported on the carrier to give a dinitrodiammine-palladium-carrying alumina as an intermediate.

The intermediate thus obtained was soaked for 1 hour in a 5% aqueous solution of sodium formate, which was prepared separately and warmed to 60° C., to effect palladium reduction. The Treated intermediate was washed with water and then dried at 110° C. for 20 hours to give a catalyst of Example 13. The resulting catalyst was determined with regard to components and physical properties, and the performance thereof was tested under the Conditions III, IV and V. The results of the determinations of a palladium content, a surface area of palladium and crystal faces of palladium were shown in Table 1, that of the amount of hydrogen desorbed from the catalyst was shown in Table 1, that of the amount of hydrogen desorbed from the catalyst was shown in Table 2, that of the performance test with regard to selective hydrogenation of propadiene and methylacetylene in propylene was shown in Table 4, that of the performance test with regard to selective hydrogenation of 1,3-butadiene in butene was shown in Table 5, and that of the performance test with regard to selective hydrogenation of decomposed gasoline was shown in Table 6.

EXAMPLE 14

The procedures as in Example 11 were repeated except that the palladium concentration in the nitric acid solution of dinitrodiamminepalladium in Example 11 was changed to 3 g/l to give a catalyst of Example 14. The resulting catalyst was determined with regard to components and physical properties, and the performance thereof was tested under the Condition III. The results of the determinations of a palladium content, a surface area of palladium and crystal faces of palladium were shown in Table 1, that of the amount of hydrogen desorbed from the catalyst was shown in Table 2, and that of the performance test with regard to selective hydrogenation of propadiene and methylacetylene in propylene was shown in Table 4.

EXAMPLE 15

The procedures as in Example 12 were repeated except that the palladium concentration in the nitric acid solution of dinitrodiamminepalladium in Example 12 was changed to 3 g/l to give a catalyst of Example 15. The resulting catalyst was determined with regard to components and physical properties, and the performance thereof was tested under the Condition III. The results of the determinations of a palladium content, a surface area of palladium and crystal faces of palladium were shown in Table 1, that of the amount of hydrogen desorbed from the catalyst was shown in Table 2, and that of the performance test with regard to selective hydrogenation of propadiene and methylacetylene in propylene was shown in Table 4.

Comparative Example 6

The intermediate obtained in Example 12 was dried at 110° C. for 20 hours, placed in an electric oven, heated up to 900° C. in 5 hours in air, and then baked at 900° C. for 4 hours to give a catalyst of Comparative Example 6. The resulting catalyst was determined with regard to components and physical properties, and the performance thereof was tested under the Conditions I and II. The results of the determinations of a palladium content, a surface area of palladium and crystal faces of palladium were shown in Table 1, that of the amount of hydrogen desorbed from the catalyst was shown in Table 2, and that of the performance test with regard to selective hydrogenation of acetylene in ethylene was shown in Table 3.

Comparative Example 7

The intermediate obtained in Example 13 was dried at 110° C. in 20 hours, placed in an electric oven and heated up to 900° C. in air in 5 hours, and then baked at 900° C. for 4 hours to prepare a catalyst of Comparative Example 7. The resulting catalyst was determined with regard to components and physical properties, and the performance thereof was tested under the Conditions III, IV and V. The results of the determinations of a palladium content, a surface area of palladium and crystal faces of palladium were shown in Table 1, and that of the amount of hydrogen desorbed from the catalyst was shown in Table 2. The results of the determinations of the performance tests with regard to selective hydrogenations of propadiene and methylacetylene in propylene, that of 1,3-butadiene in butene, and that of decomposed gasoline were shown in Tables 4, 5 and 6, respectively.

EXAMPLE 16

One handled and fifty cc of a solution of dinitrotetraamminepalladium having a palladium content of 0.5 g/l was measured and taken in a 300 cc beaker. In this solution alumina carrier having a surface area of 150 m²/g and a diameter of 3 mm was soaked for 1 hour, and the palladium compound was supported on the carrier to give a dinitrotetraamminepalladium-carrying alumina as an intermediate.

The intermediate thus obtained was soaked for 1 hour in a 2% aqueous solution of sodium boron hydride, which was prepared separately and kept at room temperature, to effect palladium reduction. The treated intermediate was washed with water and then dried at 110° C. for 20 hours to give a catalyst of Example 16. The resulting catalyst was determined with regard to components and physical properties, and the performance thereof was tested under the Conditions I and II. The results of the determinations of a palladium content, a surface area of palladium and crystal faces of palladium were shown in Table 1, that of the amount of hydrogen desorbed from the catalyst was shown in Table 2, and that of the performance test with regard to selective hydrogenation of acetylene in ethylene was shown in Table 3.

EXAMPLE 17

The procedures in Example 16 were repeated except that the palladium concentration in the dinitrotetraamminepalladium solution in Example 16 was changed to 3 g/l to give a catalyst of Example 17. The resulting catalyst was determined with regard to components and physical properties, and the performance thereof was tested under the Condition III. The results of the determinations of a palladium content, a surface area of palladium and crystal faces of palladium were shown in Table 1, that of the amount of hydrogen desorbed from the catalyst was shown in Table 2, and that of the performance test with regard to selective hydrogenation of propadiene and methylacetylene in propylene was shown in Table 4.

Comparative Example 8

The intermediate obtained in Example 16 was dried at 110° C. for 20 hours, placed in an electric oven, heated up to 900° C. in 5 hours in air, and then beaked at 900° C. for 4 hours to give a catalyst of Comparative Example 8. The resulting catalyst was determined with regard to components and physical properties, and the performance thereof was tested under the Conditions I and II. The results of the determinations of a palladium content, a surface area of palladium and crystal faces of palladium were shown in Table 1, that of the amount of hydrogen desorbed from the catalyst was shown in Table 2, and that of the performance test with regard to selective hydrogenation of acetylene in ethylene was shown in Table 3.

Comparative Example 9

The dinitrotetraamminepalladium-carrying alumina as an intermediate obtained in Example 17 was dried at 110° C. for 20 hours, placed in an electric oven, heated up to 900° C. in 5 hours in air, and then baked at 900° C. for 4 hours to give a catalyst of Comparative Example 9. The resulting catalyst was determined with regard to components and physical properties, and the performance thereof was tested under the Condition III. The results of the determinations of a palladium content, a surface area of palladium and crystal faces of palladium were shown in Table 1, that of the amount of hydrogen desorbed form the catalyst was shown in Table 2, and that of the performance test with regard to selective hydrogenation of propadiene and methylacetylene in propylene was shown in Table 4.

EXAMPLE 18

One handled and fifty cc of an aqueous solution of dinitrodiamminepalladium having a palladium content of 0.3 g/l was taken in a 300 cc beaker. In this solution 150 g of a spherical alumina carrier having a surface area of 30 m²/g and a diameter of 3 mm was soaked for 1 hour, and thus the palladium compound was supported on the carrier. The treated carrier was then dried in air at 110° C. for 20 hours and then heated at 200° C. in air for 2 hours to give a dinitrodiamminepalladium-carrying alumina as an intermediate. The intermediate thus obtained was soaked for 1 hour in 162 cc of an aqueous solution containing 5% of sodium formate warmed to 60° C. to effect palladium reduction. The treated intermediate was washed with water and then dried in air at 110° C. for 20 hours to give a catalyst of Example 18. The resulting catalyst was determined with regard to components and physical properties, and the performance thereof was tested under the Conditions I and II. The results of the determinations of a palladium content, a surface area of palladium and crystal faces of palladium were shown in Table 1, that of the amount of hydrogen desorbed from the catalyst was shown in Table 2, and that of the performance test with regard to selective hydrogenation of acetylene in ethylene was shown in Table 3.

EXAMPLE 19

The procedures in Example 18 were repeated except that the dinitrodiamminepalladium-carrying alumina intermediate dried at 110° C. for 20 hours in Example 18 was additionally heated in air at 250° C. for 2 hours to prepare a catalyst of Example 19. The resulting catalyst was determined with regard to components and physical properties, and the performance thereof was tested under the Conditions I and II. The results of the determinations of a palladium content, a surface area of palladium and crystal faces of palladium were shown in Table 1, that of the amount of hydrogen desorbed from the catalyst was shown in Table 2, and that of the performance test with regard to selective hydrogenation of acetylene in ethylene was shown in Table 3.

Comparative Example 10

The procedures in Example 18 were repeated except that 150 cc of an aqueous solution of palladium chloride having a palladium concentration of 0.3 g/l was used instead of 150 cc of an aqueous solution of dinitrodiamminepalladium having a palladium content of 0.3 g/l, to prepared a catalyst of Comparative Example 10. The resulting catalyst was determined with regard to components and physical properties, and the performance thereof was tested under the Conditions I and II. The results of the determinations of a palladium content, a surface area of palladium and crystal faces of palladium were shown in Table 1, that of the amount of hydrogen desorbed from the catalyst was shown in Table 2, and that of the performance test with regard to selective hydrogenation of acetylene in ethylene was shown in Table 3.

EXAMPLE 20

The procedures in Example 18 were repeated except that 150 cc of the aqueous solution of dinitrodiamminepalladium having a palladium concentration of 3.0 g/l was used instead of 150 cc of an aqueous solution of dinitrodiamminepalladium having a palladium concentration of 0.3 g/l in Example 18, to give a catalyst of Example 20. The resulting catalyst was determined with regard to components and physical properties, and the performance thereof was tested under the Condition III. The results of the determinations of a palladium content, a surface area of palladium and crystal faces of palladium were shown in Table 1, that of the amount of hydrogen desorbed from the catalyst was shown in Table 2, and that of the performance test with regard to selective hydrogenation of propadiene and methylacetylene in propylene was shown in Table 4.

Comparative Example 11

The procedures in Example 18 were repeated except that instead of 150 cc of an aqueous solution of palladium chloride having a palladium concentration of 3.0 g/l was used, instead of 150 cc or the aqueous solution of dinitrodiamminepalladium having a palladium concentration of 0.3 g/l in Example 18 to give a catalyst of Comparative Example 11. The resulting catalyst was determined with regard to components and physical properties, and the performance thereof was tested under the Condition III. The results of the determinations of a palladium content, a surface area of palladium and crystal faces of palladium were shown in Table 1, that of the amount of hydrogen desorbed from the catalyst was shown in Table 2, and that of the performance test with regard to selective hydrogenation of propadiene and methylacetylene in propylene was shown in Table 4.

TABLE 1

Results of determination of a palladium content, a surface are and crystal faces of palladium in catalyst

|  | Content (wt. %) | surface area ($m^2$/g palladium) | crystal face |
|---|---|---|---|
| Example 1 | 0.05 | 17 | mainly (100), (110) faces grew |
| Example 2 | 0.05 | 23 | mainly (100), (110) faces grew |
| Example 3 | 0.05 | 8 | mainly (100), (110) faces grew |
| Comparative Example 1 | 0.05 | 15 | mainly (111) face grew |
| Example 4 | 0.30 | 12 | mainly (100), (110) faces grew |
| Example 5 | 0.30 | 28 | mainly (100), (110) faces grew |
| Example 6 | 0.30 | 10 | mainly (100), (110) faces grew |
| Comparative Example 2 | 0.30 | 12 | mainly (111) face grew |
| Example 7 | 0.30 | 30 | mainly (100), (110) faces grew |
| Comparative Example 3 | 0.30 | 27 | mainly (111) face grew |
| Example 8 | 0.30 | 34 | mainly (100), (110) faces grew |
| Comparative Example 4 | 0.30 | 40 | mainly (111) face grew |
| Example 9 | 1.0 | 27 | mainly (100), (110) faces grew |
| Example 10 | 1.0 | 33 | mainly (100), (110) faces grew |
| Comparative Example 5 | 1.0 | 35 | mainly (111) face grew |
| Example 11 | 0.03 | 29 | mainly (100), (110) faces grew |
| Example 12 | 0.05 | 32 | mainly (100), (110) faces grew |
| Example 13 | 0.30 | 38 | mainly (100), (110) faces grew |
| Comparative Example 6 | 0.05 | 39 | mainly (111) face grew |
| Comparative Example 7 | 0.30 | 45 | mainly (111) face grew |
| Example 14 | 0.30 | 25 | mainly (100), (110) faces grew |
| Example 15 | 0.30 | 28 | mainly (100), (110) faces grew |
| Example 16 | 0.05 | 22 | mainly (100), (110) faces grew |
| Comparative Example 8 | 0.05 | 35 | mainly (111) face grew |
| Example 17 | 0.30 | 25 | mainly (100), (110) faces grew |
| Comparative Example 9 | 0.30 | 39 | mainly (111) face grew |
| Example 18 | 0.03 | 70 | mainly (100), (110) faces grew |
| Example 19 | 0.03 | 90 | mainly (100), (110) faces grew |
| Comparative Example 10 | 0.03 | 110 | mainly (111) face grew |
| Example 20 | 0.30 | 50 | mainly (100), (110) faces grew |
| Comparative Example 11 | 0.30 | 120 | mainly (111) face grew |

TABLE 2

Results of determination of the amount of hydrogen desorbed from catalyst

|  | ratio of the amounts of desorbed hydrogen (amount of desorbed hydrogen at a lower temperature:amount of desorbed hydrogen at a higher temperature) |
| --- | --- |
| Example 1 | 3.7:6.3 |
| Example 2 | 3.5:6.5 |
| Example 3 | 4.0:6.0 |
| Comparative Example 1 | 6.9:3.1 |
| Example 4 | 4.0:6.0 |
| Example 5 | 3.3:6.7 |
| Example 6 | 3.8:6.2 |
| Comparative Example 2 | 7.5:2.5 |
| Example 7 | 3.4:6.6 |
| Comparative Example 3 | 7.0:3.0 |
| Example 8 | 3.1:6.9 |
| Comparative Example 4 | 7.5:2.5 |
| Example 9 | 3.0:7.0 |
| Example 10 | 3.3:6.7 |
| Comparative Example 5 | 7.1:2.9 |

TABLE 2-continued

Results of determination of the amount of hydrogen desorbed from catalyst

|  | ratio of the amounts of desorbed hydrogen (amount of desorbed hydrogen at a lower temperature:amount of desorbed hydrogen at a higher temperature) |
| --- | --- |
| Example 11 | 3.2:6.8 |
| Example 12 | 3.7:6.3 |
| Example 13 | 4.0:6.0 |
| Comparative Example 6 | 7.5:2.5 |
| Comparative Example 7 | 7.8:2.2 |
| Example 14 | 3.1:6.9 |
| Example 15 | 3.4:6.6 |
| Example 16 | 3.3:6.7 |
| Comparative Example 8 | 7.3:2.7 |
| Example 17 | 3.0:7.0 |
| Comparative Example 9 | 7.2:2.8 |
| Example 18 | 3.5:6.5 |
| Example 19 | 4.0:6.0 |
| Comparative Example 10 | 6.0:4.0 |
| Example 20 | 3.1:6.9 |
| Comparative Example 11 | 6.5:3.5 |

TABLE 3

|  | tail end method | | | front end method | |
| --- | --- | --- | --- | --- | --- |
|  | activity (%) | selectivity (%) | amount of produced polymer (g/conv. $C_2H_2$ g) | activity (%) | Selectivity (%) |
| Example 1 | 95 | 33 | 0.035 | 40 | 22 |
| Example 2 | 98 | 35 | 0.032 | 39 | 24 |
| Example 3 | 95 | 32 | 0.037 | 41 | 21 |
| Comparative Example 1 | 95 | 23 | 0.068 | 39 | 14 |
| Example 11 | 90 | 36 | 0.035 | 42 | 21 |
| Example 12 | 95 | 34 | 0.041 | 42 | 22 |
| Comparative Example 6 | 96 | 23 | 0.070 | 39 | 13 |
| Example 16 | 95 | 36 | 0.039 | 42 | 22 |
| Comparative Example 8 | 95 | 25 | 0.073 | 40 | 13 |
| Example 18 | 97 | 33 | 0.035 | 39 | 21 |
| Example 19 | 98 | 31 | 0.038 | 39 | 20 |
| Comparative Example 10 | 98 | 23 | 0.080 | 42 | 12 |

TABLE 4

Results of selective hydrogenation reaction of propadiene and methylacetylene in propylene

|  |  | result of analysis | | | | estimated propylene gain |
| --- | --- | --- | --- | --- | --- | --- |
|  |  | methyl-acetylene | propadiene | propylene | propane | (mol %) |
| Example 4 |  |  |  |  |  |  |
|  | inlet | 0.3088 | 0.0784 | 94.3462 | 5.2304 |  |
|  | outlet | 0.0291 | 0.0165 | 94.5691 | 5.3491 | 0.0623 |
| Example 5 |  |  |  |  |  |  |
|  | inlet | 0.3088 | 0.0784 | 94.3462 | 5.2304 |  |
|  | outlet | 0.0211 | 0.0122 | 94.5840 | 5.3465 | 0.1075 |

TABLE 4-continued

Results of selective hydrogenation reaction of propadiene and methylacetylene in propylene

|  |  | result of analysis | | | | estimated propylene gain |
|---|---|---|---|---|---|---|
|  |  | methyl-acetylene | propadiene | propylene | propane | (mol %) |
| Example 6 | inlet | 0.3088 | 0.0784 | 94.3462 | 5.2304 | |
|  | outlet | 0.0323 | 0.0182 | 94.5723 | 5.3410 | 0.0707 |
| Comparative Example 2 | inlet | 0.3088 | 0.0784 | 94.3462 | 5.2304 | −0.1915 |
|  | outlet | 0.0308 | 0.0171 | 94.4784 | 5.4375 | |
| Example 14 | inlet | 0.3088 | 0.0784 | 94.3462 | 5.2304 | |
|  | outlet | 0.0198 | 0.0123 | 94.5805 | 5.3512 | 0.1031 |
| Example 15 | inlet | 0.3088 | 0.0784 | 94.3462 | 5.2304 | |
|  | outlet | 0.0210 | 0.0121 | 94.5640 | 5.3667 | 0.0601 |
| Example 16 | inlet | 0.3088 | 0.0784 | 94.3462 | 5.2304 | |
|  | outlet | 0.0199 | 0.0110 | 94.5546 | 5.3783 | 0.0390 |
| Comparative Example 7 | inlet | 0.3088 | 0.0784 | 94.3462 | 5.2304 | |
|  | outlet | 0.0186 | 0.0103 | 94.4391 | 5.4958 | −0.2207 |
| Example 17 | inlet | 0.3088 | 0.0784 | 94.3462 | 5.2304 | |
|  | outlet | 0.0213 | 0.0120 | 94.5764 | 5.5341 | 0.0887 |
| Comparative Example 9 | inlet | 0.3088 | 0.0784 | 94.3462 | 5.2304 | |
|  | outlet | 0.0201 | 0.0113 | 94.4498 | 5.4826 | −0.2069 |
| Example 20 | inlet | 0.3088 | 0.0784 | 94.3462 | 5.2304 | |
|  | outlet | 0.0232 | 0.0119 | 94.5758 | 5.2529 | 0.0815 |
| Example 11 | inlet | 0.3088 | 0.0784 | 94.3462 | 5.2304 | |
|  | outlet | 0.0239 | 0.0113 | 94.4643 | 5.4643 | −0.2012 |

TABLE 5

Results of selective hydrogenation reaction of 1,3-butadiene in butene

|  |  | Results of analysis (%) | | | | | | Results of analysis 1-butene yield |
|---|---|---|---|---|---|---|---|---|
|  |  | isobutane | n-butane | 1-butene | 2-butene | isobutene | 1,3-butadiene | (%) |
| Example 7 | inlet | 1.386 | 9.732 | 18.755 | 20.201 | 49.403 | 0.478 | |
|  | outlet | 1.387 | 10.235 | 17.883 | 21.046 | 49.402 | 0.003 | 90.2 |
| Comparative Example 3 | inlet | 1.386 | 9.732 | 18.755 | 20.201 | 9.403 | 0.478 | |
|  | outlet | 1.388 | 10.332 | 16.111 | 22.712 | 49.400 | 0.012 | 74.1 |
| Example 8 | inlet | 1.386 | 9.732 | 18.755 | 20.201 | 49.403 | 0.478 | |
|  | outlet | 1.397 | 10.033 | 17.921 | 21.200 | 49.397 | 0.007 | 90.5 |
| Comparative Example 4 | inlet | 1.386 | 9.732 | 18.755 | 20.201 | 49.403 | 0.478 | |
|  | outlet | 1.390 | 10.110 | 16.300 | 22.746 | 49.398 | 0.009 | 75.0 |
| Example 13 | inlet | 1.386 | 9.732 | 18.755 | 20.201 | 49.403 | 0.478 | |
|  | outlet | 1.391 | 10.319 | 17.823 | 21.020 | 49.400 | 0.002 | 92.7 |
| Comparative Example 7 | inlet | 1.386 | 9.732 | 18.755 | 20.201 | 49.403 | 0.478 | |
|  | outlet | 1.392 | 10.003 | 16.755 | 22.383 | 49.398 | 0.025 | 74.9 |

TABLE 6

Results of selective hydrogenation reaction of decomposed gasoline

|  | conversion rate of diene (%) | conversion rate of bromine value (%) | conversion rate of styrene value (%) | selectivity |
|---|---|---|---|---|
| Example 8 | 74 | 39 | 82 | 1.9 |
| Comparative Example 4 | 76 | 48 | 85 | 1.6 |
| Example 9 | 87 | 40 | 95 | 2.2 |
| Example 10 | 86 | 43 | 96 | 2.0 |
| Comparative Example 5 | 89 | 56 | 98 | 1.6 |
| Example 13 | 62 | 29 | 68 | 2.1 |
| Comparative Example 7 | 63 | 37 | 62 | 1.7 | performance calculation equation:

conversion rate of diene (%)

=(amount of dienes in reactants (mol %)—amount of dienes in products (mol %))/(amount of dienes in reactants (mol %))×100 conversion rate of bromine value (%)

=(bromine value in reactants—bromine value in products)/(bromine value in reactants)×100 conversion rate of styrene (%)

=(amount of styrene in reactants (mol %)—amount of styrene in products (mol %))÷(amount of styrene in reactants (mol %))×100 selectivity=(conversion rate of diene (%))/(conversion rate of bromine value (%))

What is claimed is:

1. A catalyst for selectively hydrogenating highly unsaturated hydrocarbon compounds in olefin compounds comprising palladium and alumina as its components, characterized in that:

exposed crystal faces of palladium crystallites are mainly occupied by (100) and (110) crystal faces;

desorption peaks of hydrogen adsorbed on the catalyst and desorbed by heating are observed in temperature ranges of from 40 to 90° C. and of from 120 to 170° C.; and a ratio of the amount of hydrogen desorbed in the former temperature range to that in the latter temperature range is from 4:6 to 3:7.

2. The catalyst for selectively hydrogenating of highly unsaturated hydrocarbon compounds in olefin compounds according to claim 1, wherein:

a surface area of palladium is from 1 to 100 m²/gram (g) of palladium;

a content of palladium is from 0.02 to 3.0% by weight; and a surface area of alumina as a carrier is from 1 to 350 m²/g.

3. A method for selectively hydrogenating actylene in ethylene, propadiene and methylacetylene in propylene, butadiene and ethylacetylene in butene, or dienes in decomposed gasoline by hydrogen in the presence of a palladium-alumina catalyst comprising palladium and alumina as its components, wherein:

exposed crystal faces of palladium crystallites are mainly occupied by (100) and (110) crystal faces;

desorption peaks of hydrogen adsorbed on the catalyst and desorbed by heating are observed in temperature ranges of from 40 to 90° C. and of from 120 to 170° C.; and a ratio of the amount of hydrogen desorbed in the former temperature range to that in the latter temperature range is from 4:6 to 3:7.

4. The catalyst according to claim 1, produced by a method comprising:

supporting a palladium compound material selected from the group consisting of palladium chlorides, palladium nitrate, ammonium tetrachloropalladate and tetracyanopalladates on alumina; and subjecting the palladium compound supported on the alumina to a heat treatment at a temperature in a range of 500 to 1200° C. in a gas stream selected from an inert gas stream and a reducing gas stream.

5. The catalyst according to claim 1, produced by a method comprising:

supporting a palladium compound selected form the group consisting of dinitropolyammine palladiums and dichlorodiammine palladiums on alumina; and subjecting the palladium compound supported on the alumina to a reduction in a liquid phase.

6. The method according to claim 3, wherein said catalyst is produced by a method comprising:

supporting a palladium compound material selected from the group consisting of palladium chlorides, palladium nitrate, ammonium tetrachloropalladate and tetracyanopalladates on alumina; and subjecting the palladium compound supported on the alumina to a heat treatment at a temperature in a range of 500 to 1200° C. in a gas stream selected from an inert gas stream and a reducing gas stream.

7. The method according to claim 3, wherein said catalyst is produced by a method comprising:

supporting a palladium compound selected from the group consisting of dinitropolyammine palladiums and dichlorodiammine palladiums on alumina; and subjecting the palladium compound supported on the alumina to a reduction in a liquid phase.

* * * * *